Patented Apr. 12, 1932

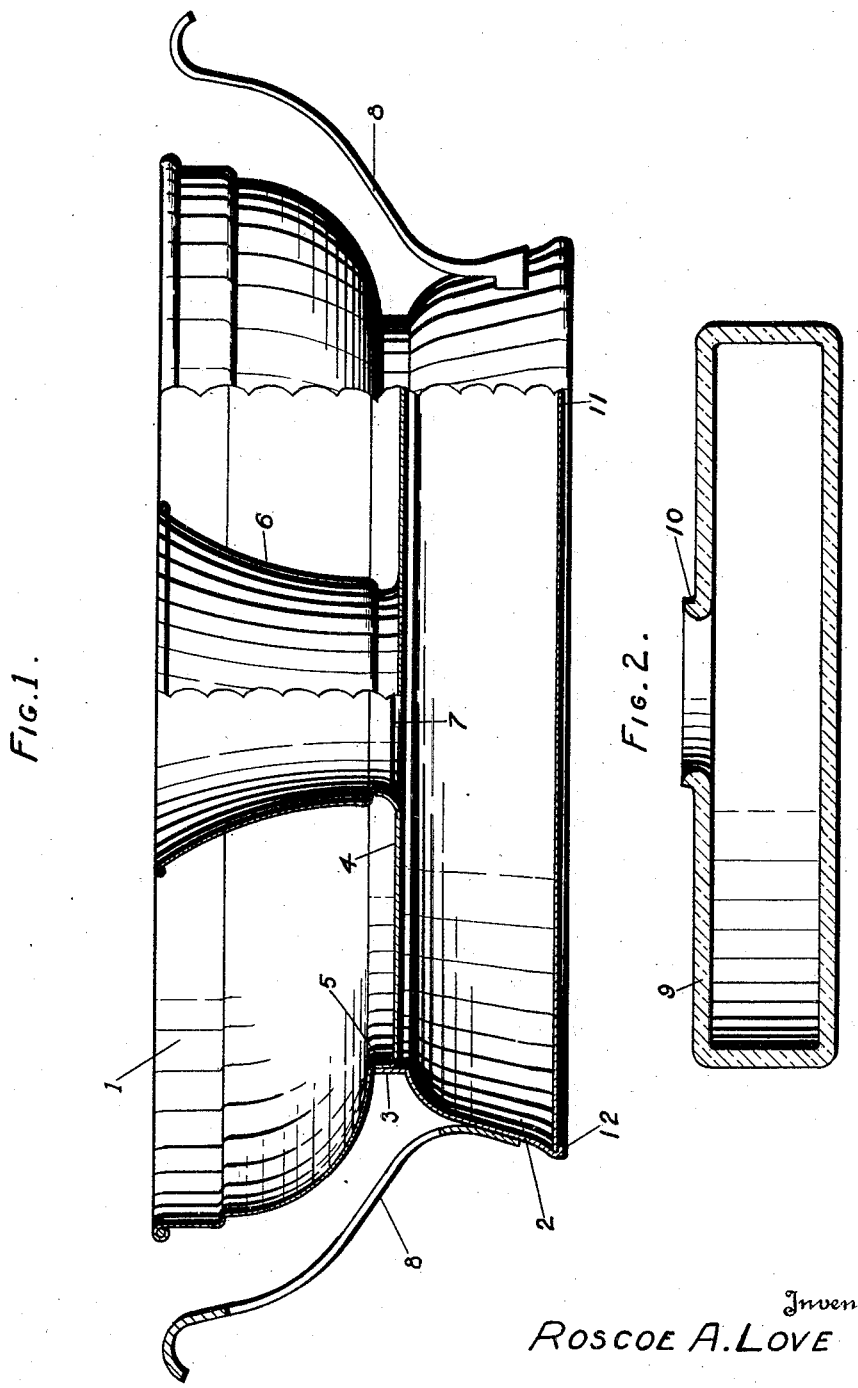

1,853,132

UNITED STATES PATENT OFFICE

ROSCOE A. LOVE, OF INDIANAPOLIS, INDIANA, ASSIGNOR TO JAMES H. REICHART, OF MUNCIE, INDIANA

BOWL AND RECEPTACLE BASE

Application filed July 11, 1930. Serial No. 467,162.

This invention relates to a bowl and receptacle base therefor and one feature of the invention is the provision of a bowl adapted to contain nuts, fruits and like commodities, and removably mount the same on a base so that the waste particles of the various commodities may be deposited into the receptacle base portion.

A further feature of the invention is the provision of means for preventing the nuts, fruits and the like from casually descending from the bowl into the receptacle base.

A further feature of the invention is the provision of means for guiding the waste particles of the nuts, fruits, etc. into the receptacle base without coming in contact with the contents of the bowl.

A further feature of the invention is the provision of means for transporting the device from place to place.

A further feature of the invention is the provision of means for converting the receptacle base and waste guiding means into a flower or bouquet receptacle.

Other objects and advantages will be hereinafter more fully set forth and pointed out in the accompanying specification.

In the accompanying drawings which are made a part of this application,

Figure 1 is an elevation partly in section of the combined bowl and receptacle base, and, Figure 2 is a sectional view of moisture container adapted to be inserted in the receptacle base when the same is employed as a flower or bouquet receptacle.

Referring to the drawings, the numeral 1 designates the bowl portion of the device and 2 indicates the receptacle base therefor, the base 2 having a vertically extending flange 3 defining an upwardly disposed opening adapted to receive the bottom portion 4 of the bowl, said bottom portion having a neck portion 5 for fitting within the flange 3 and by means of which the bowl is held in removable position on the base, the neck fitting the flange with sufficient snugness as to retain the bowl substantially in fixed relation with the base. The walls of the bowl 1 flare outwardly and upwardly from the bottom 4 and form a shoulder with neck 5 providing a dustproof joint with flange 3.

In order to introduce articles into the base portion 2, without removing the bowl therefrom, a substantially bell-shaped hollow guide or chute 6 is extended upwardly from the bottom wall 4, said bottom wall having a flanged opening 7 at its axial center, into which the lower end of the guide 6 is introduced and secured in any suitable manner, preferably by swaging or welding or both, with the upper end of the guide terminating substantially flush with the top edge of the bowl.

In order to transport the device from place to place, suitable handle members 8 are attached to the base member 2, preferably by welding, although other means may be employed for attaching the handle members to the base.

In order to adapt the device for a cut flower or bouquet holder, in addition to providing a nut or fruit receptacle, a moisture receiving cup or bottle 9 is provided, which is preferably constructed of glass, and is adapted to be housed in the receptacle base 2, said cup preferably having an extension 10 thereon adapted to register with the opening 7 in the bottom wall 4, so that the stems of flowers may be entered into the cup and by placing water or other moisture producing medium within the cup, the life of the cut flowers will be greatly prolonged. The device without the bottle 9 may be utilized as a spray or bouquet holder when no water is required therewith.

The parts of the bowl and receptacle base therefor are preferably constructed of sheet metal so that all the parts thereof may be stamped out, thus greatly reducing the cost of production, the bottom wall 11 of the base 2 being first introduced into the base portion and the edge 12 of the base portion then turned inwardly and over the edge of the bottom wall 11. Bottom member 11 is of greater area than the opening defined by flange 3, and the walls of the base 2 extend upwardly and inwardly toward the flange to provide a base member of considerable capacity.

It will likewise be seen that the bowl and base portion therefor may be separated and used individually if desired and may be utilized for many different purposes.

While the description and drawings illustrate in a general way certain instrumentalities which may be employed in carrying the invention into effect, it is evident that many modifications may be made in the various details without departing from the scope of the appended claims, it being understood that the invention is not restricted to the particular examples herein described.

I claim as my invention:

1. The combination with a bowl structure having an opening through the bottom wall thereof, a hollow guide fixed in said opening and extending upwardly from the bottom wall of said bowl, and a hollow base member for supporting said bowl, of a receptacle adapted to be entered in said hollow base member and supply moisture to plants or the like entered thru said guide into said receptacle and an extension on said receptacle adapted to register with said opening.

2. In a combined receptacle base and a removable bowl therefor, a base having an upwardly disposed opening, a removable bowl, the bottom portion of which fits in said opening and which has a hole at a medial point thereof, the walls of said bowl flaring outwardly from said opening to provide a bowl of considerable capacity and forming a shoulder which rests on the edge of said opening and forming a substantially dust-proof joint therewith, and a chute secured to the bottom portion at the edges of said hole, said chute being flared outwardly and upwardly for funneling particles into said base.

3. In a combined receptacle base and a removable bowl therefor, a base having an upwardly disposed opening, a removable bowl, the bottom portion of which fits in said opening and which has a hole at a medial point thereof, the walls of said bowl flaring outwardly from said opening to provide a bowl of considerable capacity and forming a shoulder which rests on the edge of said opening and forming a substantially dust-proof joint therewith, a chute secured to the bottom portion at the edges of said hole, said chute being flared outwardly and upwardly for funneling particles into said base, and handles on the base which extend upwardly on opposite sides of said bowl.

4. In a combined receptacle base and a removable bowl therefor, a base having an upwardly disposed opening, a bottom member larger than said opening, walls which extend from the proximity of said opening to the periphery of said bottom member to provide a base member of considerable capacity, a removable bowl, the bottom portion of which fits in said opening and which has a hole at a medial point thereof, the walls for said bowl flaring outwardly from said opening to provide a bowl of considerable capacity and forming a shoulder which rests on the edge of said opening and forms a substantially dust-proof joint therewith, and a chute secured to said bottom portion at the edges of said hole, said chute being flared outwardly and upwardly for funneling particles in said base.

5. In a combined receptacle base and a removable bowl therefor, a base having an upwardly disposed opening, a bottom member larger than said opening, walls which extend from the proximity of said opening to the periphery of said bottom member to provide a base member of considerable capacity, a removable bowl, the bottom portion of which fits in said opening and which has a hole at a medial point thereof, the walls for said bowl flaring outwardly from said opening to provide a bowl of considerable capacity and forming a shoulder which rests on the edge of said opening and forms a substantially dust-proof joint therewith, a chute secured to the bottom portion at the edges of said hole, said chute being flared outwardly and upwardly for funneling particles into said base, and handles carried by said base, which extend upwardly on opposite sides of said bowl.

In testimony whereof, I have hereunto set my hand on this the 5th day of July, 1930, A. D.

ROSCOE A. LOVE.